United States Patent [19]
Shrock

[11] Patent Number: 5,397,170
[45] Date of Patent: Mar. 14, 1995

[54] HEADREST BRACKET

[75] Inventor: Fred J. Shrock, Elkhart, Ind.

[73] Assignee: Shrock Manufacturing, Inc., Elkhart, Ind.

[21] Appl. No.: 123,685

[22] Filed: Sep. 20, 1993

[51] Int. Cl.[6] .............................................. A47C 7/02
[52] U.S. Cl. ............................. 297/452.18; 297/391
[58] Field of Search ............ 297/391, 396, 410, 452.18

[56] References Cited

U.S. PATENT DOCUMENTS

| | | | |
|---|---|---|---|
| 3,498,672 | 3/1970 | Leichtl | 297/410 |
| 3,860,287 | 1/1975 | Platt | 297/452.52 |
| 4,519,650 | 5/1985 | Terada et al. | 297/452.18 |
| 4,854,642 | 8/1989 | Vidwans et al. | 297/410 |
| 5,328,244 | 7/1994 | Ishihara et al. | 297/391 |

FOREIGN PATENT DOCUMENTS 3344560  6/1985  Germany ............................ 297/410

Primary Examiner—F. Daniel Lopez
Attorney, Agent, or Firm—James D. Hall

[57] ABSTRACT

A bracket for mounting a headrest assembly to a vehicle seat frame. The headrest bracket includes a pair of spaced housing parts connected by one or more cross members to define a central recess part. The cross members may be integral parts of the top and bottom walls of each housing part. When mounted to the upper cross bar of the seat frame, the cross member overlies the cross bar. The recess part allows the center springs or other support members to be connected to the upper cross bar through. The recess part may have an opening to allow the supports to be connected directly to the cross bar.

6 Claims, 3 Drawing Sheets

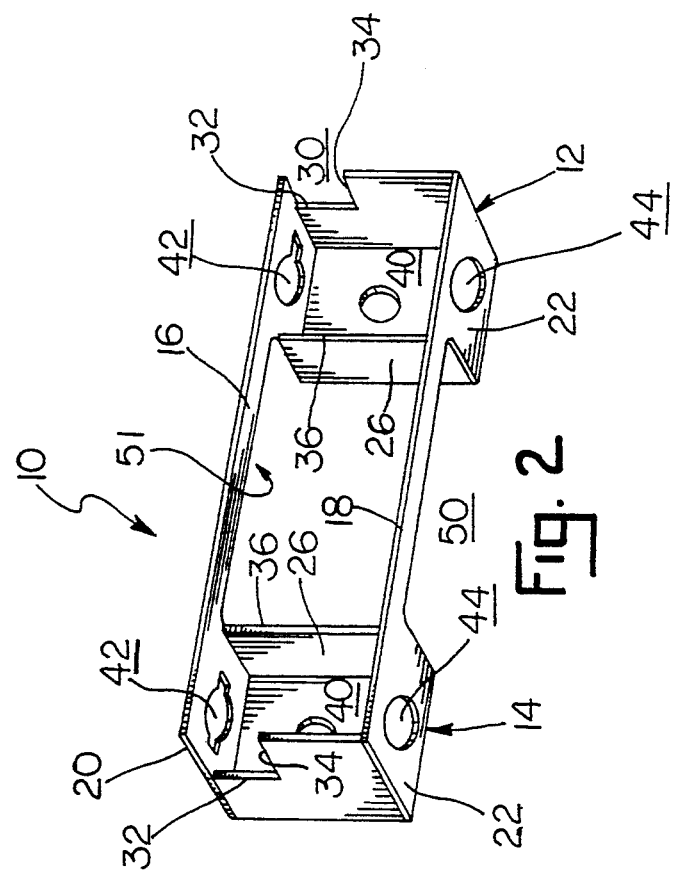
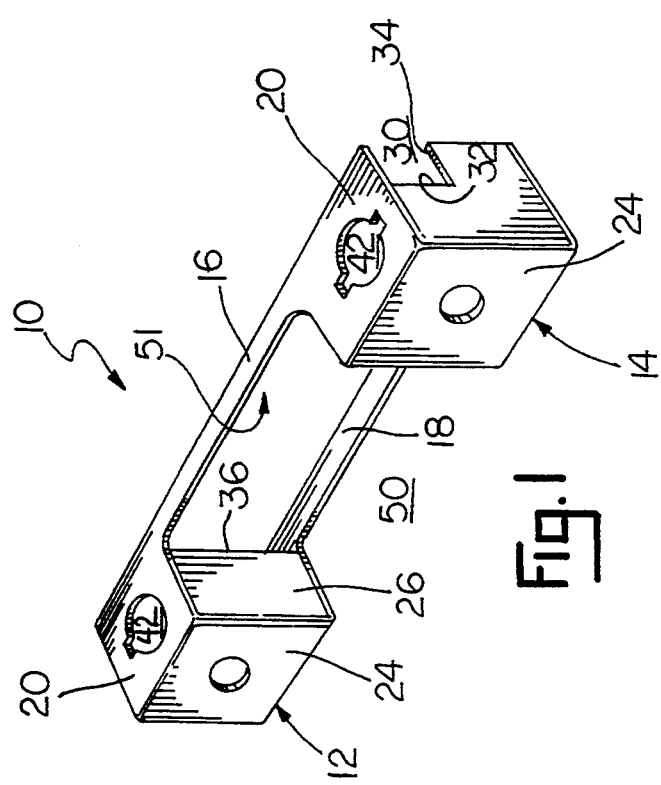
Fig. 2
Fig. 1

HEADREST BRACKET

This invention relates to a headrest bracket used to mount a headrest assembly to a vehicle seat frame, and particularly a bracket, which does not interfere with the springs and support members of the seat frame.

BACKGROUND OF THE INVENTION

Headrest assemblies are common features on vehicle seats. Conventional headrest assemblies include an padded headrest and one or more extension members. The headrest assemblies are secured to seat frames by brackets mounted to the upper cross members of the seat frames. The headrest brackets support the extension members and allow the headrest to be shifted up and down to the desired positions. Generally the brackets are single units. Because the headrests are centrally mounted on the seat frame, the headrest brackets often interfere with the center springs or support straps of the seat frame. Consequently, the center springs or straps are often removed to accommodate the headrest bracket. This creates a weakened section down the centerline of the seat frame back support which adversely affects comfort and durability.

SUMMARY OF THE INVENTION

The headrest bracket of this invention is adapted for use with conventional seat or seat-bed frames and may be installed without eliminating the center springs or support members from the seat frame. The headrest bracket includes a housing, which is preferably a pair of spaced housing parts integrally connected by a cross member. The housing parts and the cross members define a generally U-shaped bracket with a central recess part. The recess part accommodates a center support and may include an opening to permit the direct connection of a center spring or other supports members to the seat frame cross bar.

Accordingly, an object of this invention is to provide for a unique and novel headrest bracket for a vehicle seat frame.

Another object is to provide for a headrest bracket for a vehicle seat frame, which does not interfere with the center spring or other support members of the seat frame.

Other objects will become apparent upon a reading of the following description.

BRIEF DESCRIPTION OF THE DRAWINGS

A preferred embodiment of the invention has been depicted for illustrative purposes only wherein:

FIG. 1 is a front perspective view of the headrest bracket of this invention;

FIG. 2 is a rear perspective view of the headrest bracket of FIG. 1;

DESCRIPTION OF THE PREFERRED EMBODIMENT

Figure 3:
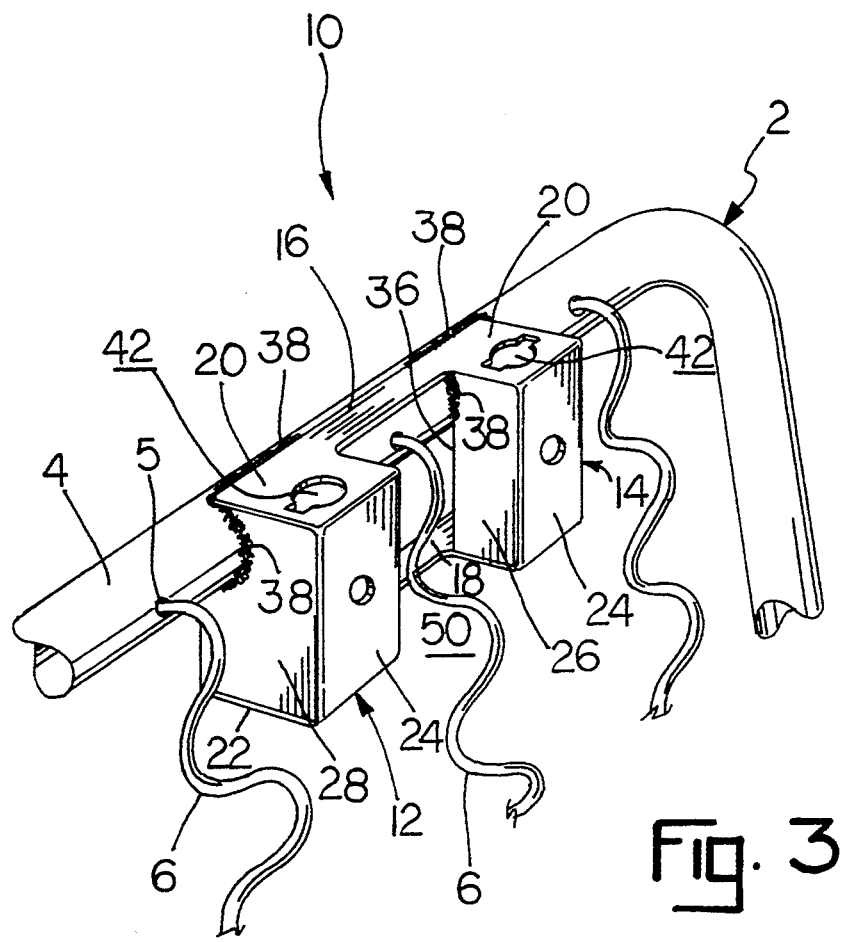
FIG. 3 is a fragmented perspective view of the bracket of this invention as shown mounted to a seat frame with spring supports.

The preferred embodiment herein described are not intended to be exhaustive or to limit the invention to the precise form disclosed. They are chosen and described to explain the principles of the invention and its application and practical use to enable others skilled in the art to utilize its teachings.

FIGS. 1 and 2 show the headrest bracket 10 of this invention. Preferably, bracket 10 is constructed from a single stamped metal plate, although the bracket may be constructed in any suitable fashion from any suitable material. As shown, bracket 10 includes a housing which preferably has spaced housing parts 12, 14 connected by upper and lower cross members 16, 18. Each housing part 12, 14 includes a top wall 20 and bottom wall 22 connected by a front wall 24 and spaced side walls 26, 28. Top and bottom walls 20, 22, front wall 24 and side walls 26, 28 of each housing part 12, 14 define an interior cavity 40 which is preferably open at the rear. Each top wall 20 has an opening 42, and each bottom wall 22 has an opening 44, which is axially aligned with opening 42.

Cross members 16, 18 are preferably integral with each top and bottom wall 20, 22, respectively. Cross members 16, 18 extend between housing parts 12, 14 along the rear side of bracket 10 to define a central recess part 50 between the housing parts 12, 14. Recess part 50 may define an opening 51 as shown. Each outer side wall 28 has an inset upper rear edge 32 and a rear shoulder edge 34. The rear edges 36 of inner walls 26 preferably align laterally with the outer wall inset edges 32. Top walls 20 extend perpendicularly beyond outer wall inset edge 32 and inner rear edges 36 to form a generally squared groove 30 along the back of bracket 10.

Figure 4:
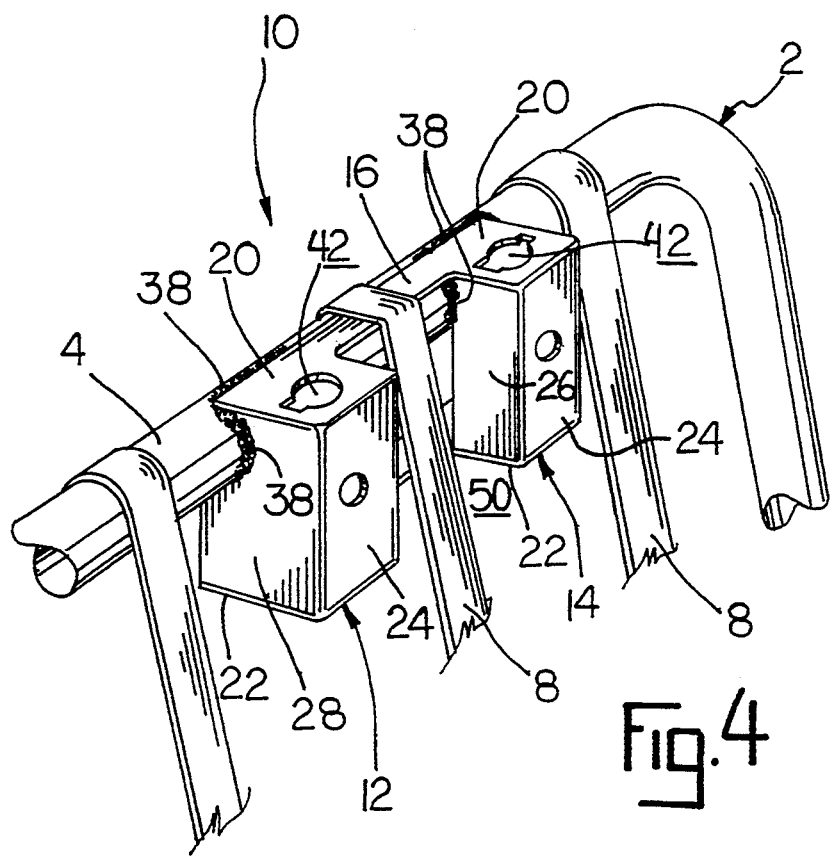
FIG. 4 is a fragmented perspective view of the bracket of this invention as shown mounted to seat frame with strap supports.

FIGS. 3 and 4 show bracket 10 mounted to a seat frame 2. As shown in FIG. 3, seat frame 2 includes an upper cross bar 4 with support springs 6 connected to cross bar 4 with the upper ends of springs 6 fitted into holes 5 along the front of cross bar 4. FIG. 4 shows seat frame 2 with support straps 8 extended around cross bar 4.

In both embodiments, bracket 10 is shown fixedly mounted, as by weldments 38 to cross bar 4. Bracket 10 is positioned on seat frame 2 with cross bar 4 fitted within groove 30. Bracket 10 contacts cross bar 4 along the length of upper cross member 16, inset and shoulder edges 32, 34 of outer walls 28 and inner wall rear edge 36. Bracket 10 is secured to cross bar 4 as by welds 38 at each contact point. Groove 30 provides a strong three point connection on the upper, lower and forward edges of cross bar 4. As shown, upper cross member 16 substantially overlies the top of cross bar 4. As shown in FIGS. 3 and 4, the center support spring 6 of FIG. 3 and the center support strap 8 of FIG. 4 extend from cross bars 4 across recess part 50 between housing parts 12, 14. Recess part 50 and opening 51 allows support springs 6 and straps 8 to be mounted directly to cross bar 4 without obstruction or interference with the alignment of the other support springs.

Figure 6:
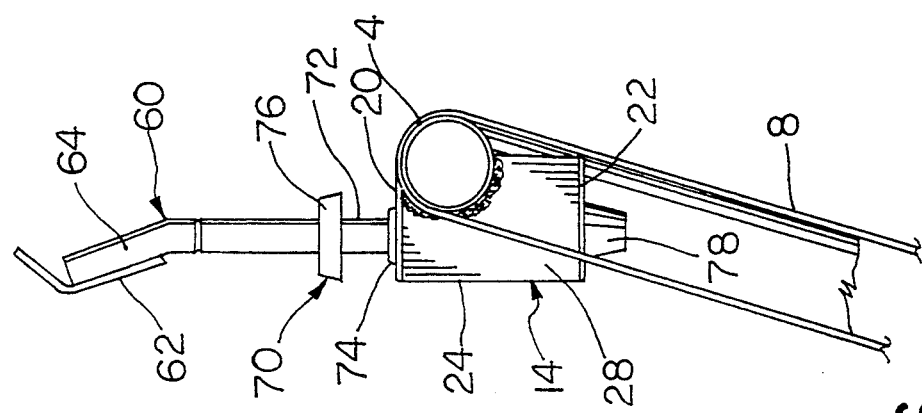
FIG. 6 is a fragmented sectional view of the bracket and seat frame as taken along line 6—6 of FIG. 5.
Figure 5:
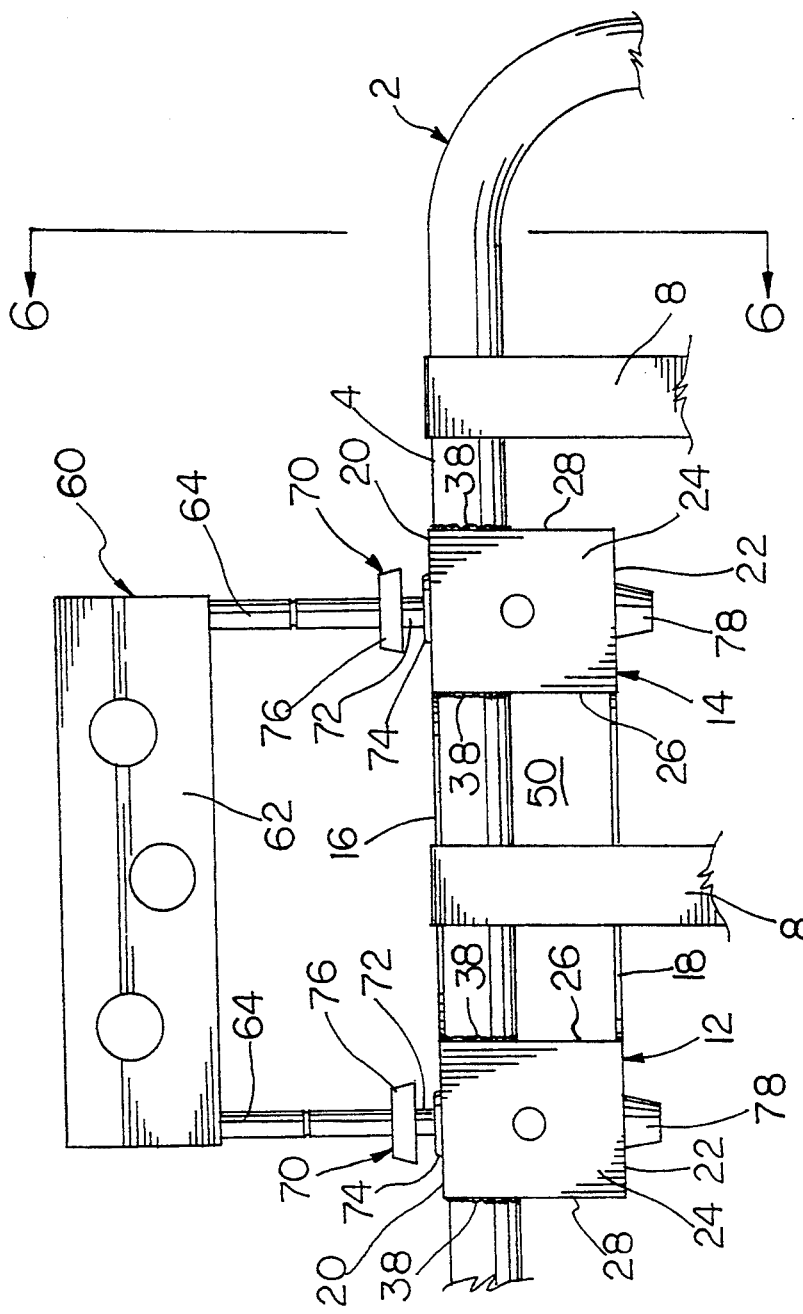
FIG. 5 is a fragmented front elevation view of the bracket mounted to the seat frame of FIG. 4 and carrying a headrest frame.

FIGS. 5 and 6 show a headrest frame 60 fitted within bracket 10. Headrest frame 60 includes a headrest back part 62 and spaced extension rods 64. Rods 64 have inserts 70 which are fitted through insert openings 42, 44 in each housing part 12, 14 and extend through cavity 40. Each insert 70 has a tubular rod 72 and a grommet 76. Washer 74 is secured to frame part top walls 20. End cap 78 houses each rod 72 and secures headrest frame 60 in bracket 10. Tubular rods 72 accept extension rods 64 of headrest frame 60. Inserts 70 allow extension rods 64 and the connected back part 62 to be raised and lowered within tubular rods 72. Headrest 60 as shown is a conventional article well known in the automotive industry.

It is understood that the above description does not limit the invention to the details given, but may be modified within the scope of the following claims.

I claim:

1. In combination, a headrest bracket adapted for supporting a headrest assembly, and a seat frame, said seat frame including spaced upright frame parts connected by a cross bar, said headrest bracket including:

a housing, said housing mounted to said cross bar and having a central recess part, said recess part constituting means for accommodating a seat frame center support, said housing being generally U-shaped and including spaced housing parts joined by a cross member, said recess part defined between said spaced housing parts, each housing part including a top and bottom wall connected by a pair of side walls, said cross member being integrally formed with each top wall.

2. The combination of claim 1 wherein each housing part has a channel defined in said side walls, said cross bar fitted within said channel.

3. The combination of claim 1 wherein each housing part defines an aperture means for accommodating an extension rod of said headrest assembly.

4. In combination, a seat frame, a headrest bracket mounted on said seat frame, said seat frame including a pair of spaced upright frame parts and a cross bar connecting said spaced upright frame parts, said headrest bracket comprising a housing defined by a pair of spaced housing parts joined by a cross member, each of said housing parts including a pair of side walls joined by a front wall, said cross bar being secured to said side walls and extending through said side walls, said cross member being joined to corresponding side walls on each of said brackets, said cross member being offset from said front walls and cooperating with said corresponding side walls to define a generally u-shaped recess in said headrest bracket, and a seat frame center support extending into said recess between said corresponding side walls and secured to said cross bar.

5. The combination as claimed in claim 4, wherein said headrest bracket includes upper and lower cross members, each of said upper and lower cross members being joined to each of said corresponding side walls.

6. The combination as claimed in claim 5, wherein each housing part defines an aperture means for accommodating an extension rod of said headrest assembly.

* * * * *